DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 3, 1974

926 O.G. 9

T926,001

CROSS-LINKABLE COMPOSITIONS

Karl Brack, Wilmington, Del., assignor to Hercules Incorporated, Wilmington, Del.

Continuation of appplication Ser. No. 140,,993, May 6, 1971, which is a continuation-in-part of abandoned application Ser. No. 811,204, Mar. 27, 1969. This application Oct. 19, 1972, Ser. No. 298,895

Int. Cl. C08g *41/04*

U.S. Cl. 260—858

No Drawing. 24 Pages Specification

Cross-linkable, storage stable polymer compositions can be prepared from the following ingredients (a) an ethylenically unsaturated polymer such as an unsaturated polyurethane, alkyd resin, or butadiene polymer or copolymer;

(b) a small amount of a precursor of a polyfunctional nitrile N-oxide or nitrile imine having a formula selected from

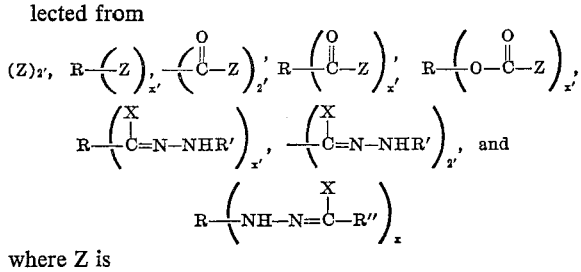

where Z is

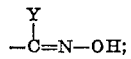

Y is $—NO_2$ or a halide radical; R is a hydrocarbon, halogenated hydrocarbon, hydrocarbon-oxy-hydrocarbon, hydrocarbon-thio-hydrocarbon or hydrocarbon-sulfonyl-hydrocarbon radical; R′ is a hydrogen, alkyl, cycloalkyl, aryl, alkaryl, or aralkyl radical; R″ is an alkyl, cycloalkyl, aryl, alkaryl, or aralkyl radical; X is a halide radical; and $x$ is an integer from 2 to 5;

(c) an amount of a solid vicinal epoxide in excess of that required to convert the said precursor to the corresponding polyfunctional nitrile N-oxide or nitrile imine. The above described storage stable polymer compositions cross-link when heated at a temperature of about 70° C. to about 180° C. and are useful in sealant, adhesive and coating formulations.